Sept. 1, 1931.  E. H. HULL  1,821,836
PICK-UP DEVICE
Filed April 7, 1930

Inventor:
Edwin H. Hull,
by Charles E. Muller
His Attorney.

Patented Sept. 1, 1931

1,821,836

UNITED STATES PATENT OFFICE

EDWIN H. HULL, OF SCHENECTADY, NEW YORK, ASSIGNOR TO GENERAL ELECTRIC COMPANY, A CORPORATION OF NEW YORK

PICK-UP DEVICE

Application filed April 7, 1930. Serial No. 442,185.

My invention relates to phonographic pick-up devices and has for its principal object the provision of a pick-up device whose operation is based upon the magnetostrictive properties of metals.

It is well known that when some metals are put under tension, such as iron for example, their permeabilities are increased and in others, such as nickel for example, their permeabilities are decreased while under compression the exact opposite effect is obtained. In accordance with my invention I have made use of these properties of metals in a phonographic pick-up device by providing therefor a bimetallic element as a core for a current coil and causing one end of such element to be vibrated by the phonograph stylus during operation.

My invention will be better understood from the following description when considered in connection with the accompanying drawings and its scope will be pointed out in the appended claims.

Figure 1:
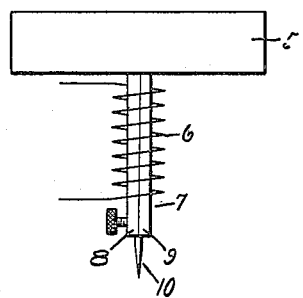
Figure 2:
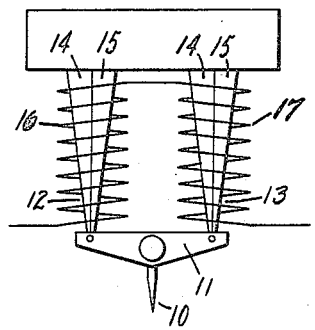

Referring to the accompanying drawings Fig. 1 illustrates diagrammatically the simplest form of my invention and Fig. 2 illustrates a modification thereof. Fig. 1 illustrates a device including a base 5, a coil 6 and a core 7. The core 7 is rigidly attached to the base 5 at one of its ends and extends through the coil 6. It comprises a resilient bimetallic rod made up of two elements 8 and 9 made of two different metals, such as iron and nickel for example. The free end of the rod 7 is arranged to support the phonograph stylus 10. In operation, the stylus 10 vibrates the free end of the rod 7 in accordance with its passage over the phonograph record. Due to these vibrations, the two elements 8 and 9, being rigidly attached to each other, are alternately placed under tension and compression and when one part is under tension the other is correspondingly under compression and vice versa. Since the respective permeabilities of the metals, as has already been explained, vary in proportion to the amount of tension or compression the permeability of the rod is varied in proportion to the displacement of the end of the rod by the phonograph stylus. This change of permeability varies the current flowing through the coil 6 or, in other words, generates a variable component which is superposed upon said current and which is passed to suitable amplifying apparatus and thereafter converted into sound by any convenient converting apparatus.

Fig. 2 illustrates, also diagrammatically, a modification of my invention in which the stylus 10 is supported by a cross bar 11 which is pivoted to magnetostrictive members 12 and 13 and constitutes a link between them. These magnetostrictive members are somewhat tapered but are each made up of two elements 14 and 15 respectively in a manner similar to the rod 7. They may have either a semi-circular or substantially rectangular cross section. They are furthermore so arranged in alternate successive relation to each other that, during operation similar elements are simultaneously under tension or compression respectively. In this modification two coils 16 and 17 mounted respectively on the members 12 and 13 are connected in series to obtain a combined effect of the variations of the permeability of the two members. With this arrangement it is possible to obtain a somewhat greater output than with the arrangement of Fig. 1.

What I claim as new and desire to secure by Letters Patent of the United States is:

1. In a phonographic reproducing device, a plurality of magnetostrictive members rigidly mounted at one end and connected at their respective other ends by a stylus supporting link, each of said members comprising two metallic elements rigidly attached to each other and possessing opposite magnetostrictive characteristics, current coils arranged to surround each of said members respectively and connected in cooperative relation with each other.

2. In a phonographic reproducing device, a plurality of magnetostrictive members rigidly mounted at one end and connected at their respective other ends by a stylus supporting link, each of said members comprising two elements having opposite magnetostrictive properties, said members being so arranged that said elements are in alternate successive relation to each other, and operating coils mounted upon said members respectively and connected in series with each other.

In witness whereof, I have hereunto set my hand this 5th day of April, 1930.

EDWIN H. HULL.